Figure 1:
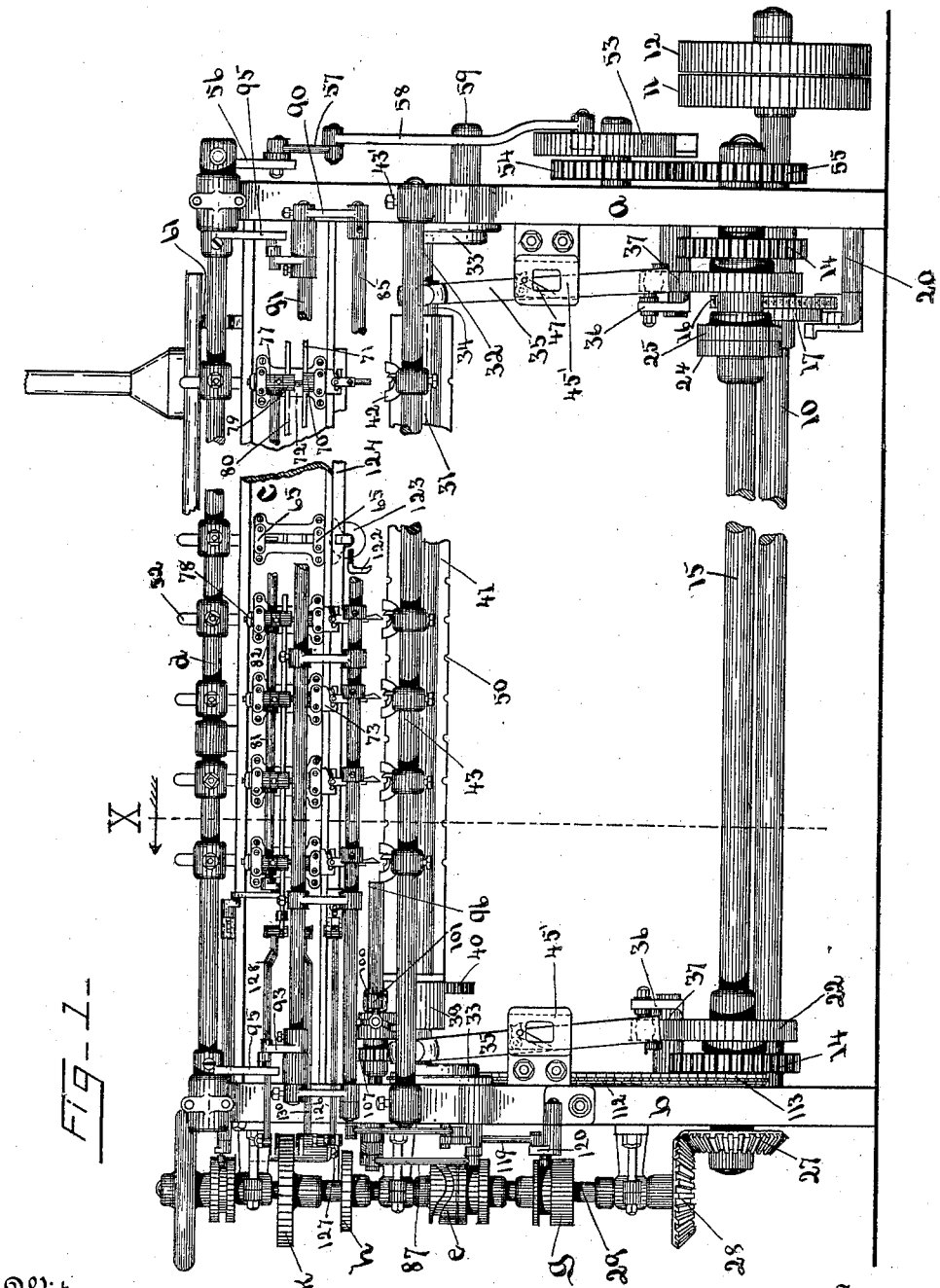

No. 684,587. Patented Oct. 15, 1901.
W. H. PALMER, Jr.,
QUILT KNOTTING MACHINE.
(Application filed Dec. 14, 1891.)
(No Model.) 16 Sheets—Sheet 1.

No. 684,587. Patented Oct. 15, 1901.
W. H. PALMER, Jr.
QUILT KNOTTING MACHINE.
(Application filed Dec. 14, 1891.)
(No Model.) 16 Sheets—Sheet 3.

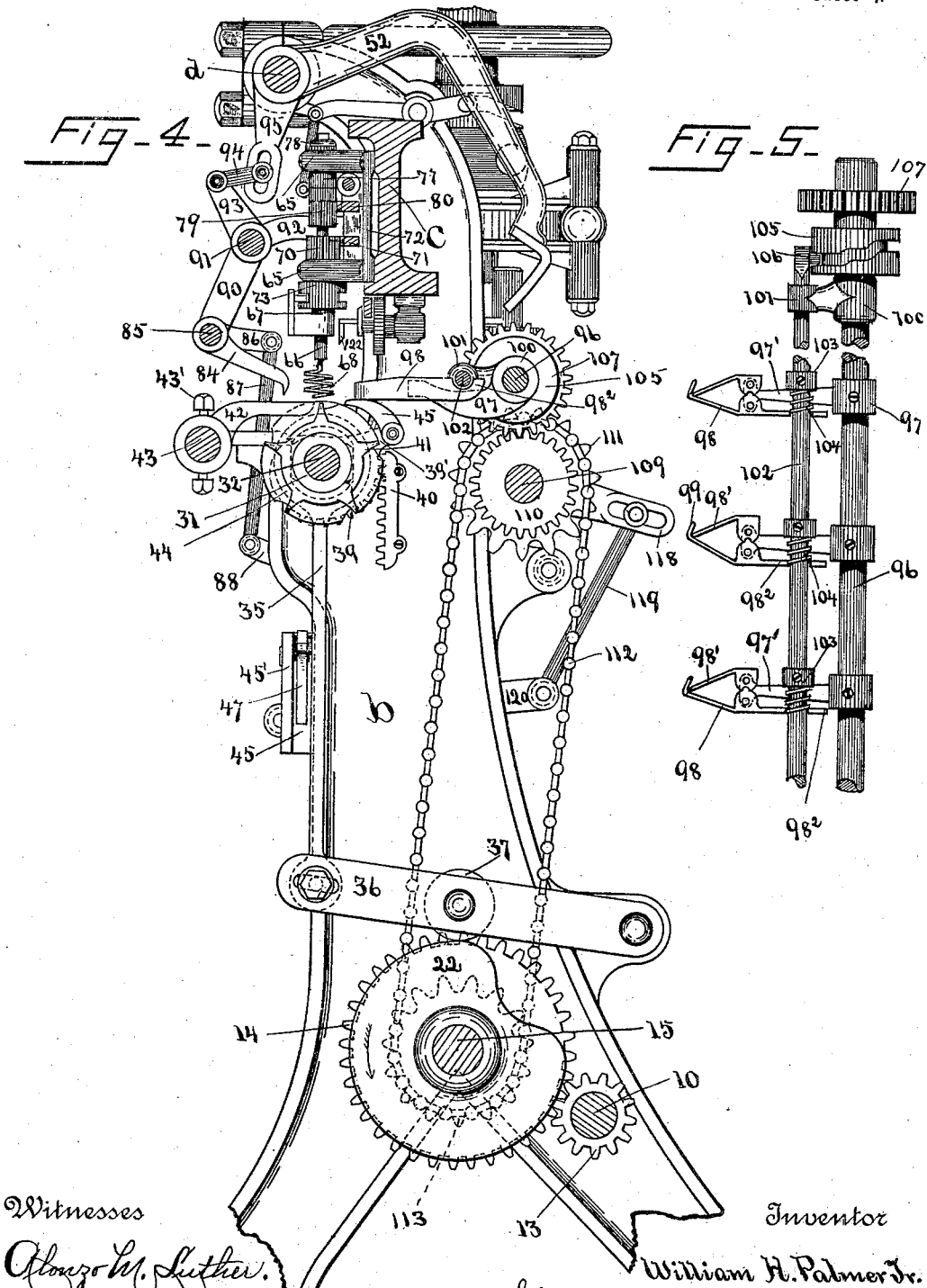

No. 684,587. Patented Oct. 15, 1901.
W. H. PALMER, Jr..
QUILT KNOTTING MACHINE.
(Application filed Dec. 14, 1891.)
(No Model.) 16 Sheets—Sheet 5.

Witnesses
Alonzo M. Luther.
Allen Tenny.

Inventor
William H. Palmer Jr.
By his Attorney
Frank H. Allen.

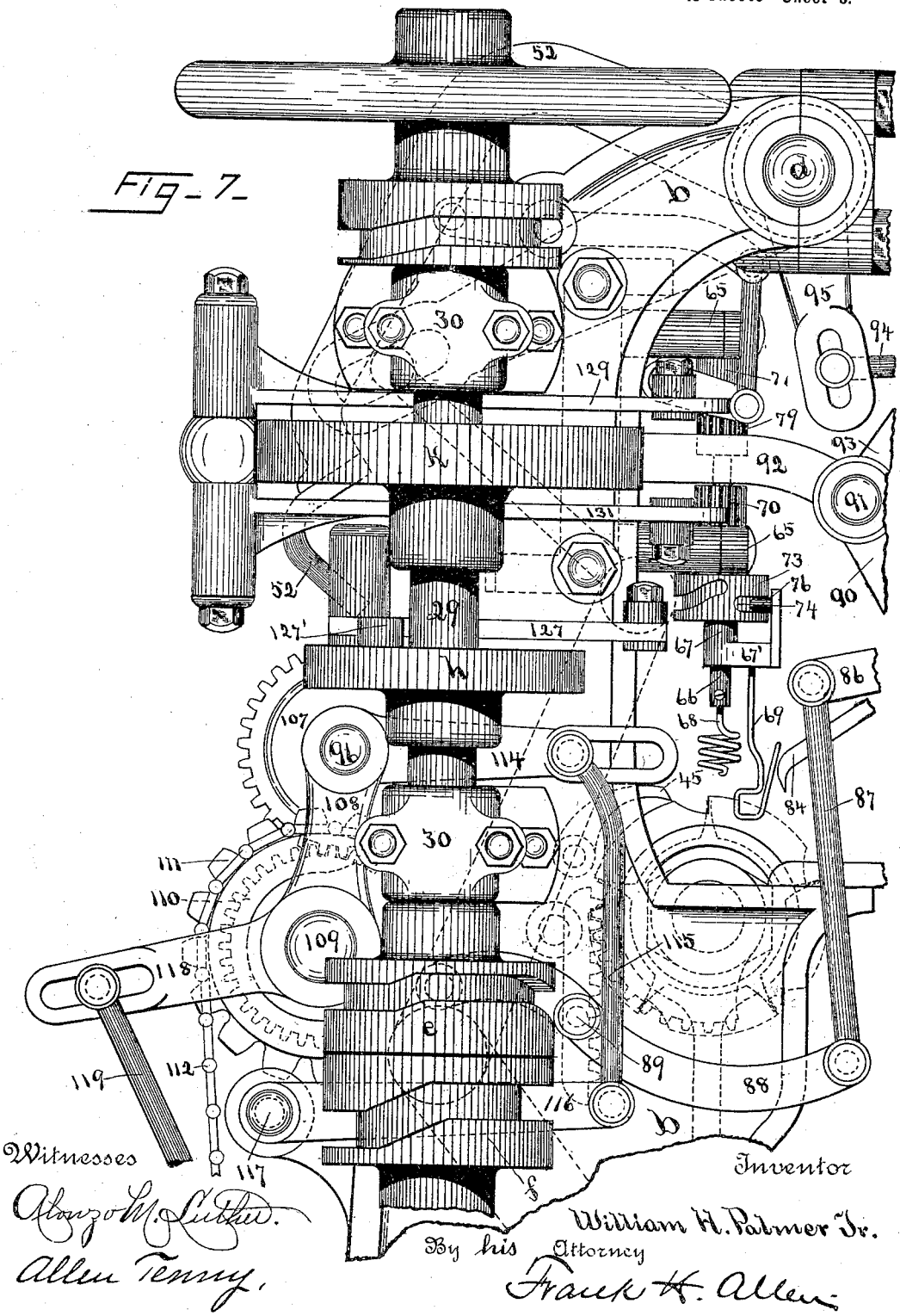

No. 684,587. Patented Oct. 15, 1901.
W. H. PALMER, Jr.
QUILT KNOTTING MACHINE.
(Application filed Dec. 14, 1891.)
(No Model.) 16 Sheets—Sheet 7.
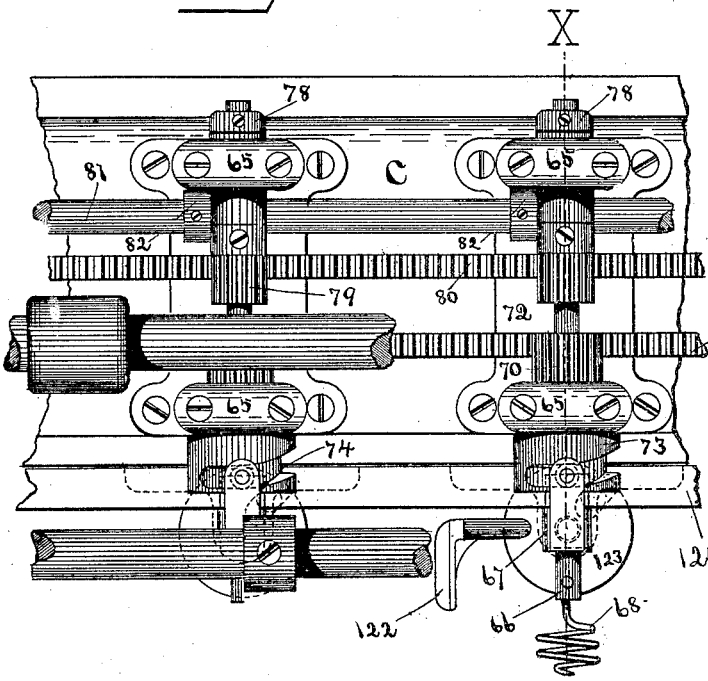
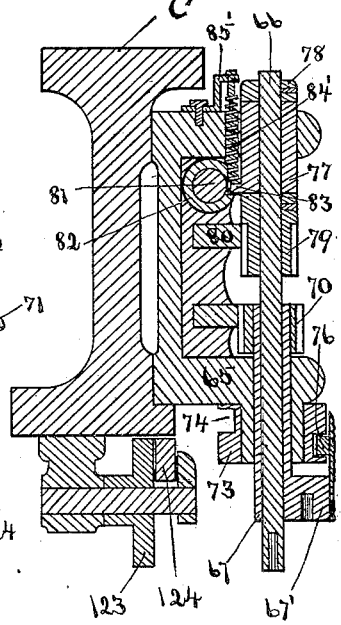
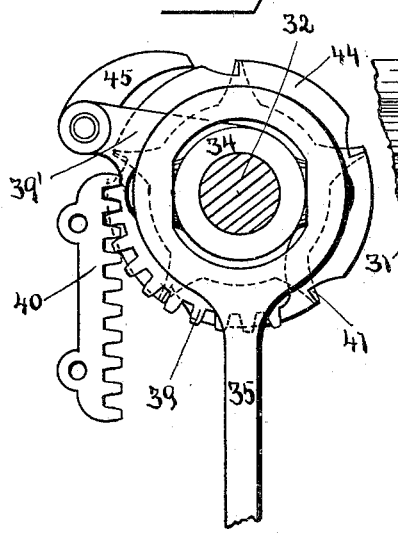
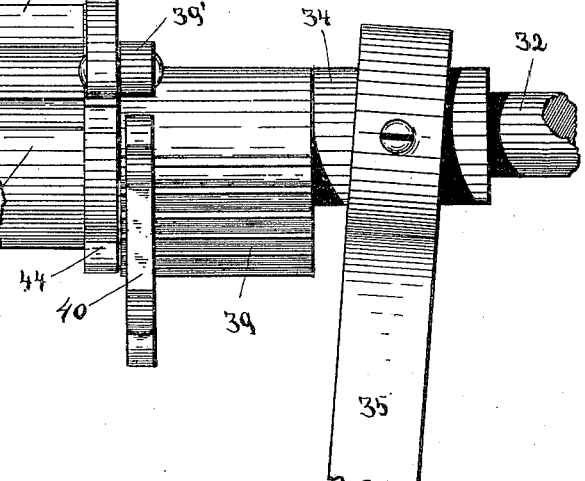
Witnesses
Alonzo M. Luther.
Allen Tenny.
Inventor
William H. Palmer Jr.
By his Attorney
Frank H. Allen.

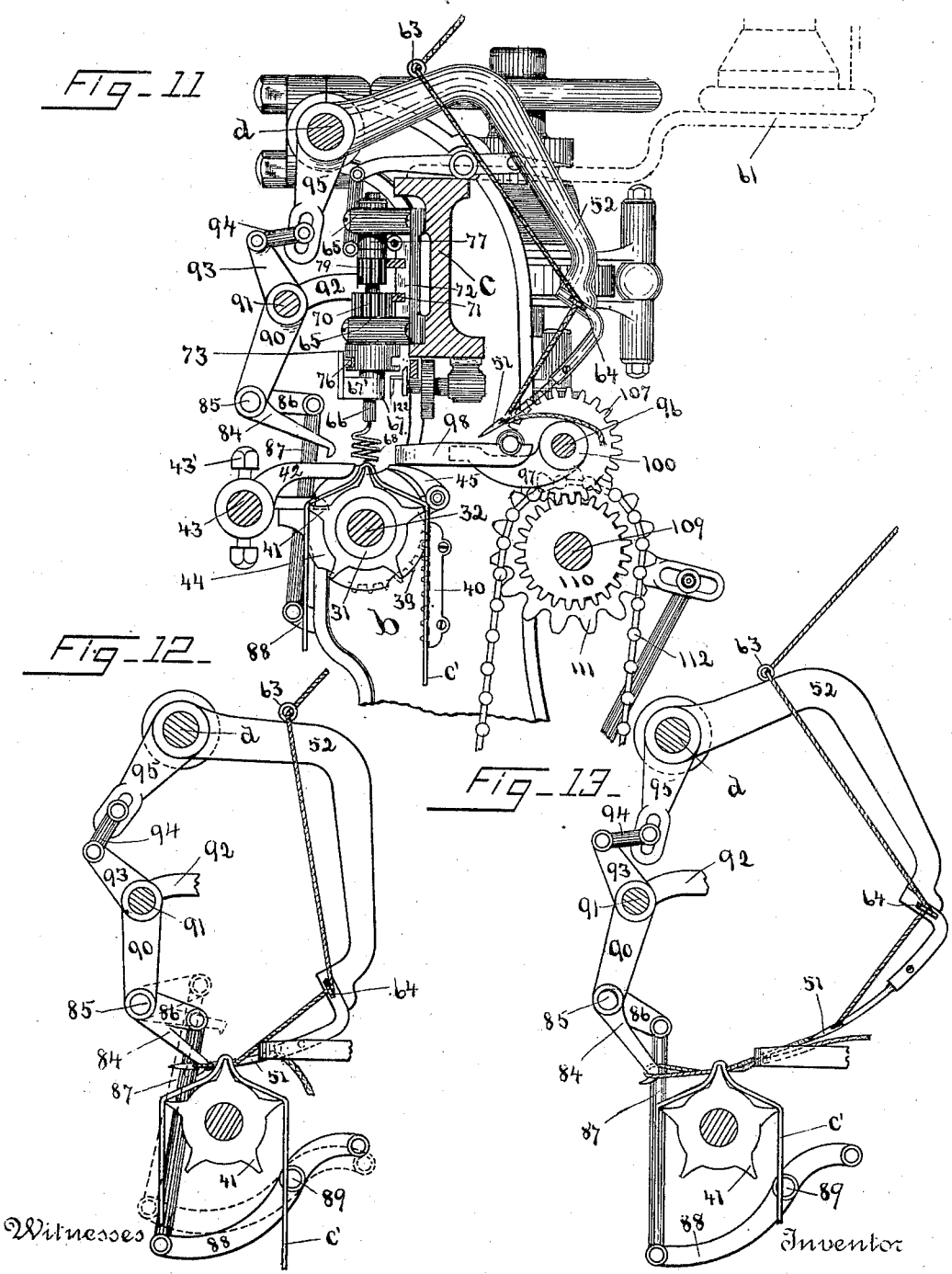

No. 684,587.  
Patented Oct. 15, 1901.  
W. H. PALMER, Jr.  
QUILT KNOTTING MACHINE.  
(Application filed Dec. 14, 1891.)

(No Model.)  
16 Sheets—Sheet 9.

Witnesses  
Alonzo M. Luther.  
Allen Tenny.

Inventor  
William H. Palmer Jr.  
By his Attorney  
Frank H. Allen.

No. 684,587. Patented Oct. 15, 1901.
W. H. PALMER, Jr.
QUILT KNOTTING MACHINE.
(Application filed Dec. 14, 1891.)
(No Model.) 16 Sheets—Sheet 10.

Witnesses
Alonzo M. Luther.
Allen Tenny.

Inventor
William H. Palmer Jr.
By his Attorney
Frank H. Allen.

No. 684,587. Patented Oct. 15, 1901.
W. H. PALMER, Jr.
QUILT KNOTTING MACHINE.
(Application filed Dec. 14, 1891.)
(No Model.) 16 Sheets—Sheet 11.

Witnesses
Alonzo M. Luther.
Allen Tenny.

Inventor
William H. Palmer Jr.
By his Attorney
Frank H. Allen.

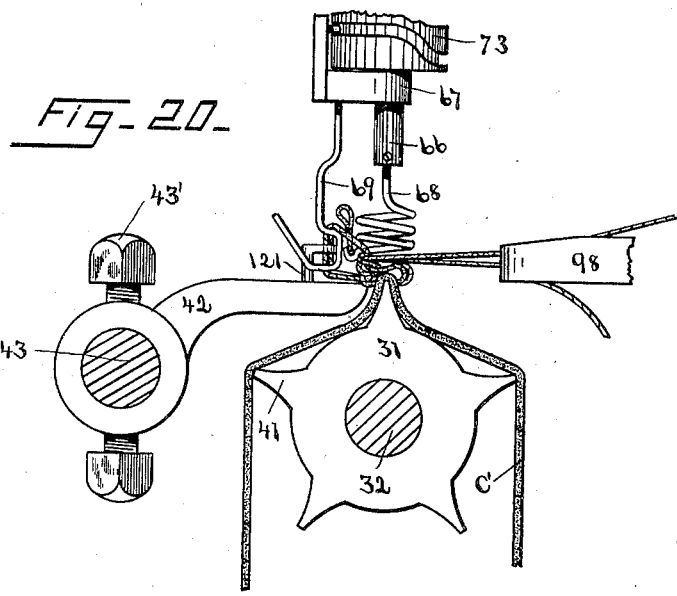
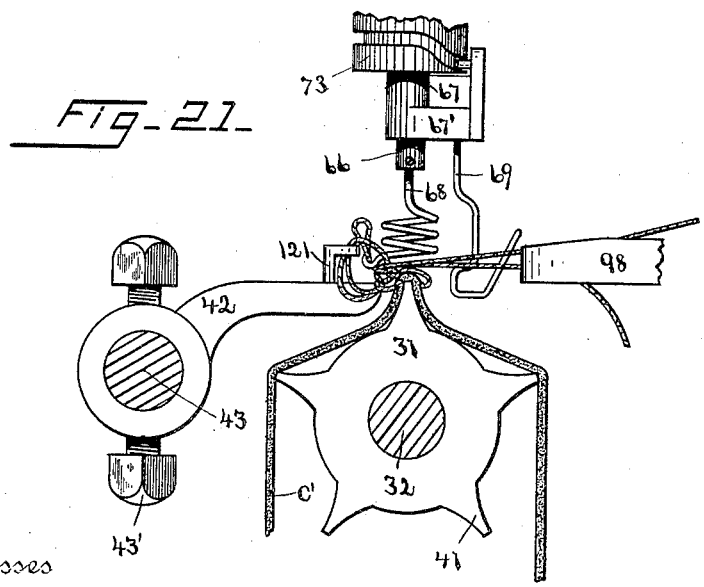

No. 684,587. Patented Oct. 15, 1901.
W. H. PALMER, Jr.
QUILT KNOTTING MACHINE.
(Application filed Dec. 14, 1891.)
(No Model.) 16 Sheets—Sheet 13.

Witnesses
Alonzo M. Luther
Allen Tenny

Inventor
William H. Palmer Jr.
By his Attorney
Frank H. Allen

No. 684,587. Patented Oct. 15, 1901.
W. H. PALMER, Jr.
QUILT KNOTTING MACHINE.
(Application filed Dec. 14, 1891.)
(No Model.) 16 Sheets—Sheet 14.
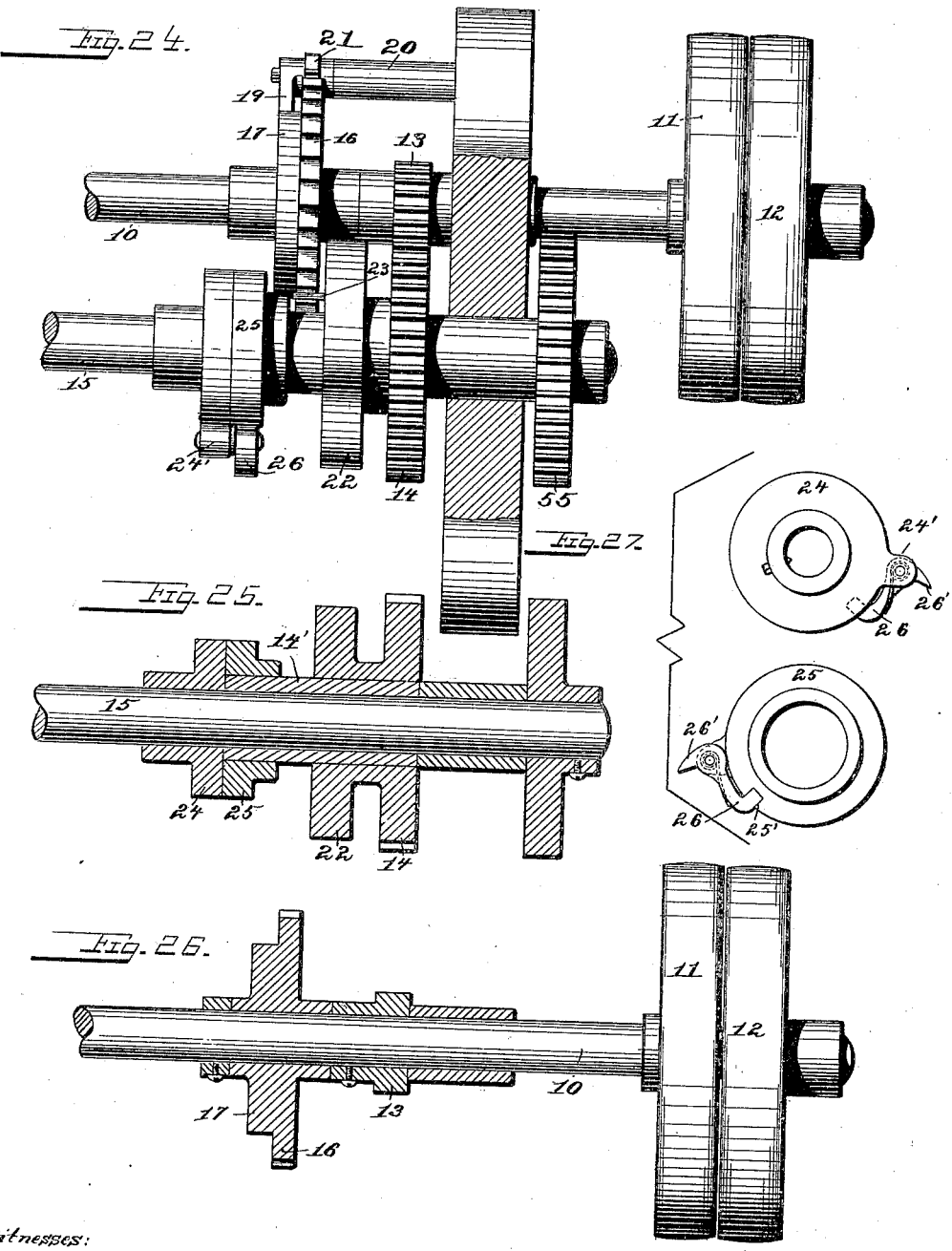

No. 684,587.  
W. H. PALMER, Jr.  
QUILT KNOTTING MACHINE.  
(Application filed Dec. 14, 1891.)

Patented Oct. 15, 1901.

(No Model.)

16 Sheets—Sheet 15.

Witnesses  
Alonzo M. Luther.  
Allen Tenny.

Inventor  
William H. Palmer Jr.  
By his Attorney  
Frank H. Allen

No. 684,587.  
W. H. PALMER, Jr.  
QUILT KNOTTING MACHINE.  
(Application filed Dec. 14, 1891.)

Patented Oct. 15, 1901.

(No Model.)

16 Sheets—Sheet 16.

UNITED STATES PATENT OFFICE.

WILLIAM H. PALMER, JR., OF NORWICH, CONNECTICUT, ASSIGNOR TO THE PALMER BROTHERS COMPANY, OF NEW LONDON, CONNECTICUT.

QUILT-KNOTTING MACHINE.

SPECIFICATION forming part of Letters Patent No. 684,587, dated October 15, 1901.

Application filed December 14, 1891. Serial No. 414,986. (No model.)

*To all whom it may concern:*

Be it known that I, WILLIAM H. PALMER, Jr., a citizen of the United States, residing at Norwich, in the county of New London and State of Connecticut, have invented certain new and useful Improvements in Knotting-Machines, which improvements are fully set forth and described in the following specification, reference being had to the accompanying sixteen sheets of drawings.

My invention has for its object the production of automatic mechanisms which being combined in a single structure and working in harmony will feed compound fabric of the class used in making bed-comfortables and tie the face fabrics and interposed filling together by a multiple of sections of knotted yarn, these knots being isolated from each other—that is to say, separated by an appreciable space—and of such number and so disposed throughout the comfortable that the filling and cover fabrics are held against displacement on each other. The knots thus provided may be arranged in rows crossing each other at right angles or may be arranged in quincunx form, as may be preferred, the former arrangement being illustrated in Figure 32 of the drawings and the latter in Fig. 33.

I prefer to use in connection with my newly-invented knotting-machine compound fabric in continuous length, although it is equally valuable and performs its operations as perfectly when the fabric is first cut into sections of the size of a finished comfortable. Embodied in the said machine are mechanisms for feeding the prepared fabric forward at stated times, for shunting the same to one side when it is desired to produce knots arranged in quincunx form, for clamping the fabric at several points where knots are to be formed, and for tying said knots. To operate these specified principal mechanisms at proper times, suitable elemental mechanisms and connections are provided, each being in turn described hereinafter.

The drawings hereto annexed show the said machine as a whole and also (for a more clear understanding of the same) in detail, the detail and fractional views being in many instances drawn on an enlarged scale—that is to say, Sheets 1, 2, 3, and 16 are one-eighth of full size, Sheets 4, 5, 8, 9, 10, 11, 12, 13, and 14 are one-fourth size, and Sheets 6, 7, and 15 are one-half size.

Figure 2:
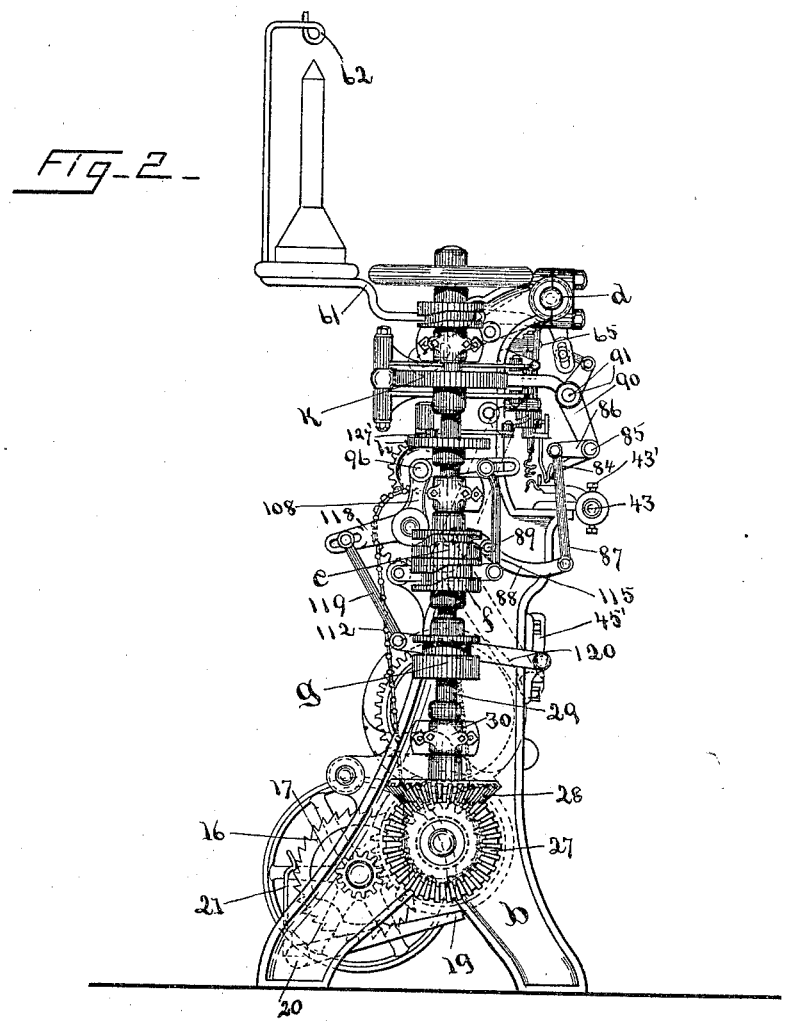
Figure 3:
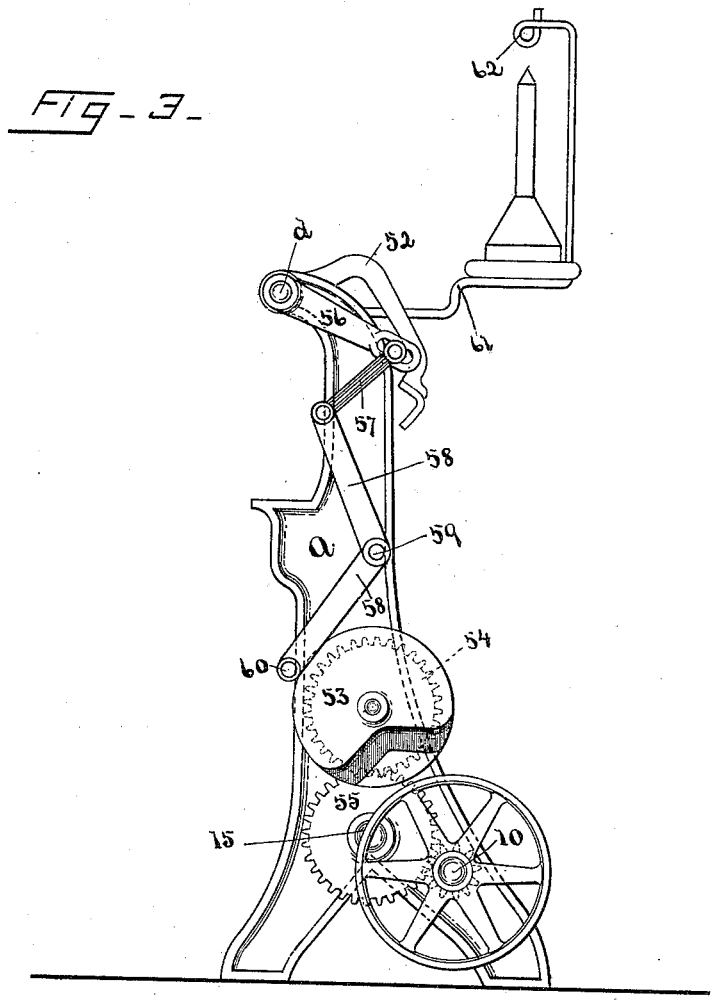
Figure 6:
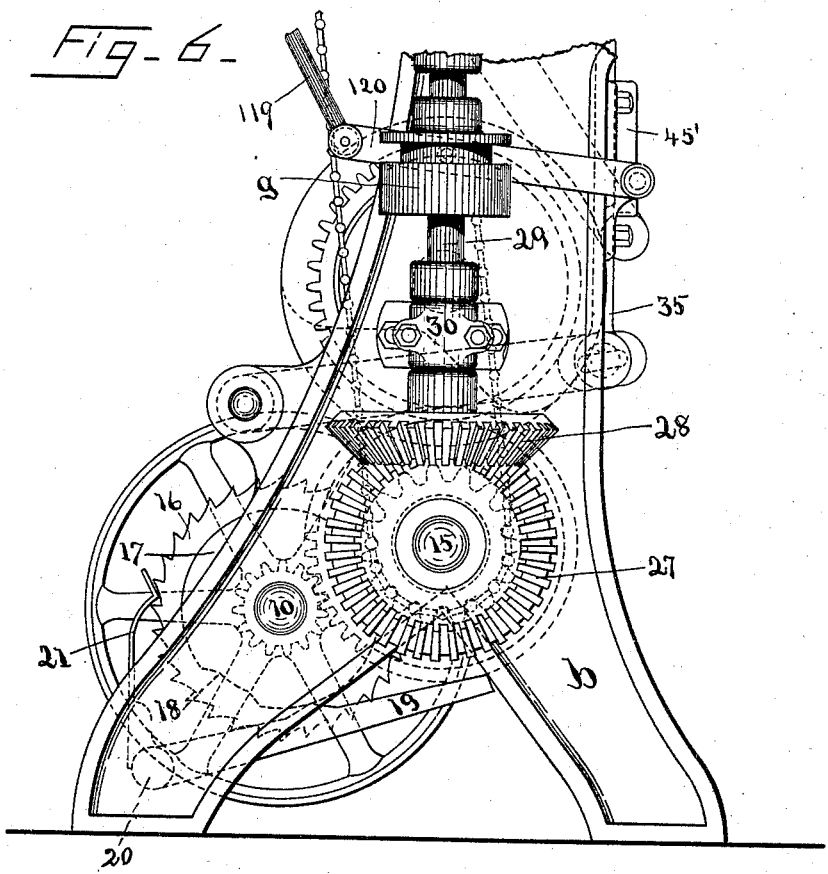
Figure 32:
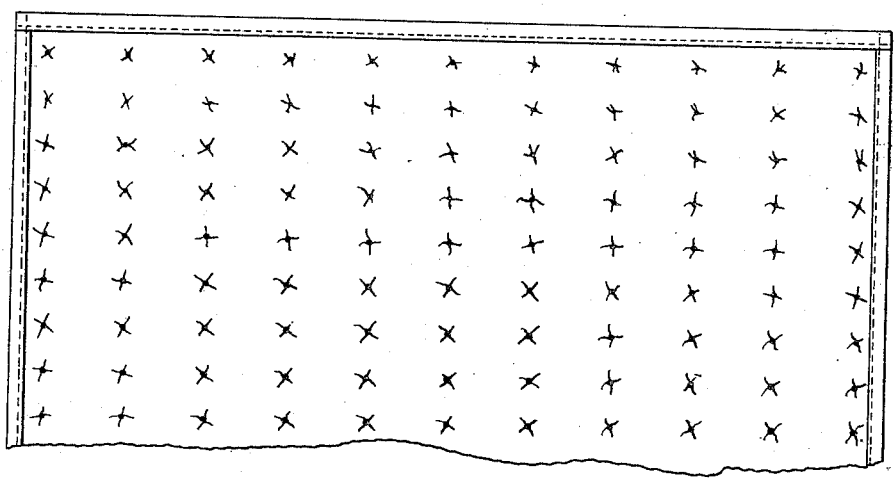
Figure 33:
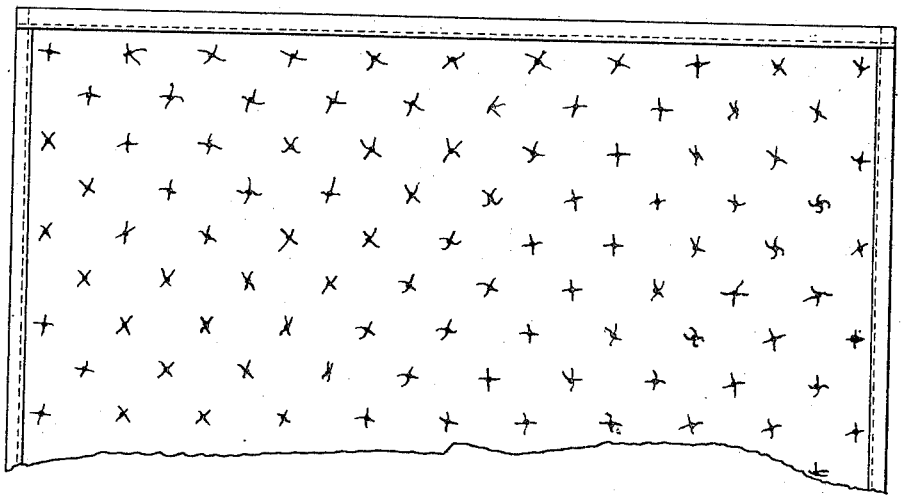

In the drawings, Fig. 1 is a front side elevation of a machine of my new construction; and Fig. 2, an elevation of the same from the left-hand end, showing particularly the cam-shaft and its driving mechanism. Fig. 3 is an elevation of the opposite or right-hand frame of the machine, showing the mechanism for operating the needle-arm. Said machine may be of any desired length and may contain any desired number of knotting mechanisms. Fig. 4 is a cross-sectional view of the upper portion of my machine on line X of Fig. 1 looking in the direction indicated by the arrow, and Fig. 5 is a top view of the nippers or fingers 98 98' and portions of their actuating-rods. Fig. 6 is an outer side elevation of the lower portion of frame $b$; and Fig. 7, a similar view, enlarged, of the upper portion of said frame with its attached parts. Fig. 8 shows a portion of the angle-bar or head that supports the series of spiral hooks employed in the formation of a knot and also illustrates the means provided for rotating said hooks. Fig. 9 is a cross-sectional view on line X of Fig. 8, the spiral hook being removed. In Figs. 10 and 10$^a$ I have shown in detail the mechanism provided for feeding the compound fabric forward between the operations of knotting. Fig. 11 is a sectional view of the upper portion of the machine, showing the needle threaded and the several parts of the knotting mechanism in their respective positions as if about to begin the formation of a knot. Figs. 12 to 23 (both inclusive) show the successive positions assumed by the knot-tying mechanism during the operation of forming a complete knot. Figs. 24, 25, 26, and 27 are details of the main driving-shaft of my machine, showing the manner of distributing motion to the fabric-feeding devices and to the vertical cam-shaft 29. Figs. 28, 29, 30, and 31 illustrate a simple form of switch, by means of which the compound fabric is automatically shunted from side to side as it is fed forward. Figs. 32 and 33 illustrate the manner in which the series of knots may be disposed through the face of the comfortable.

The framework of my machine consists of two end uprights $ab$ and a connecting angle-bar $c$, the bar being of suitable size, shape, and strength to receive and support the various elementary parts of the knotting mechanisms.

The reference-figures 10 denote the main or driving shaft of the machine, journaled in frames $a\ b$ and provided at one end with fast and loose pulleys 11 12, as shown, or, if preferred, with any convenient form of frictionally-acting clutch-pulley. Shaft 10 bears at each end a fast gear 13, that meshes with a larger loose gear 14, secured to a sleeve 14' on a supplemental shaft 15, also journaled in frames $a\ b$. Under certain conditions which I will proceed to describe the shaft 15 is caused to rotate, special attention being now called to Sheets 1, 2, 5, and 14 of the drawings. Loosely fitted on shaft 10, adjacent to gear 13, is a ratchet-wheel 16, having secured to its face a disk 17, whose periphery is cut away or notched, as at 18, Fig. 6, to form an edge cam, against which bears an arm 19, pivoted to a stud 20, projecting from frame $a$. A spring 21, serving as a detent, extends upward from the hub of lever-arm 19 and rests against the notches of the ratchet-wheel. Spring 21 also serve to hold the said lever-arm in constant engagement with the cam 17. Secured to the gears 14, already described, are disks 22, one of said disks having a pin 23 projecting from its face in such relation to the ratchet-wheel 16 that at each revolution of said disk 22 the pin will engage a single tooth of the ratchet-wheel and move said wheel forward a corresponding distance, the wheel being prevented from jumping ahead by momentum by the detent 21, which snaps from tooth to tooth. It will now be understood that the constantly-revolving gear 13 imparts continuous rotary motion to gear 14 and its connected disk 22 and that pin 23 will cause ratchet-wheel 16 and its cam-disk 17 to rotate with an intermittent or step-by-step movement; also, that during each revolution of disk 17 the lever-arm 19, following the edge of said disk, will be allowed to raise slightly during the passage of the cam-notch 18.

Secured to the sleeve 14' on shaft 15 is a disk 25, serving as one-half of a clutch, the companion disk 24 being secured directly to said shaft 15, as best seen in Fig. 25. Both faces of said clutch are illustrated in Fig. 27. Section 24 has a radial projection 24', to which is hung a latch 26 in line with clutch-section 25, whose periphery is notched, as at 25', to receive the inwardly-bent end of the latch, said bent end being held normally in engagement with the notch 25' (or with the periphery of the disk 25) by any suitable spring—as, for example, a wire spring coiled around the stud on which the latch is hung. The opposite end of the latch projects radially from the disks, forming a spur or horn 26', that is in vertical alinement with the lever-arm 19, already referred to. The end of said lever-arm is of such length that it reaches a point immediately under the described clutch-disk 25, and when allowed to rise by notch 18 said free end lies in the circular path of horn 26' as the latter revolves.

Assuming that the clutch-disks 24 25 are locked together by latch 26, the shaft 15 will be caused to rotate with gear 14 and its sleeve 14' until such time as the intermittently-moving ratchet-wheel 16 shall bring the cam-notch 18 around and so permit the lever-arm 19 to rise. When this occurs, the horn 26' of the latch 26 abuts the end of said lever-arm and the bent end of the latch is withdrawn from the notch 25'. The clutch-section 24 and its connected shaft 15 then stop and remain at rest until such time as the end of lever-arm 19 is again depressed, when latch 26 is immediately thrown into locking engagement with disk 25 and the shaft 15 starts again. I have provided the form of clutch just described for the reason that it is simple in construction; but it will be obvious that other forms of clutches could be readily substituted therefor.

The driving mechanism thus far explained provides for shaft 15 a slow rotary movement, with periods of rest (at stated times) proportionate to the length of cam-notch 18. During these periods of rest the knotting devices, which are controlled by shaft 15, remain inactive, while the fabric-feeding mechanism continues to operate with this result: the fabric is fed along regularly; but one or more rows of knots are omitted, leaving at stated distances a wide space between said rows of knots. When it is desired later to cut the knotted fabric into suitable lengths to form comfortables, it (the fabric) is cut between the rows in these wide clear spaces, thus leaving the ends of the comfortable free from knots and in readiness to receive the strip of binding-cloth or other finish, which is secured around the edges of the completed quilt or comfortable. The shaft 15 extends through frame $b$ and has secured to its end a bevel-gear 27, that meshes with a corresponding gear 28 on a vertical shaft 29, hung in bearings 30, bolted to said frame $b$. This vertical shaft bears a number of groove-cams, each of which serves an important purpose and will be described in its proper place.

The fabric-feeding devices which I prefer to employ consist, in brief, of a ribbed cylinder so supported that it may be lowered, rotated to feed the fabric, shunted lengthwise, and finally raised again into position for the knotting operation. Said cylinder is indicated by reference-figures 31 and is loosely mounted on a bar 32, which is held against lateral displacement at each end by vertical guides 33, secured to the inner sides of the frames $a\ b$, the bar being free to rise and fall within said guides. Each end of cylinder 31 is journaled in a collar 34, having trunnions that are supported in the upper ends of bars 35, whose lower ends are connected by ball-and-socket joints with the free ends of arms 36, hinged to the machine-frame. Pivoted to one side of arms 36 are rolls 37, that rest on the cam-disks 22, one of said disks having been referred to as bearing the pin 23, that actuates the ratchet-wheel 16. At each revolution of cam-disks 22 the free ends of levers 36 are allowed to drop for an instant, thus permitting the bar 32 to move downward in the guides 33. On one end of bar 32 is a loose gear-segment 39, that meshes with a fixed rack 40 and serves in connection with the pawl and ratchet hereinafter described to partially rotate the cylinder as the latter is lowered. This is done for the purpose of bringing successively into proper position each of a series of radial ribs 41, that extend from end to end of the cylinder and on which the compound fabric is clamped while the knots are being tied. The ribs as they rise to place force the fabric under a system of presser-feet 42, and thus crimp the fabric and double it back on each side of the top rib, as most clearly seen in Fig. 14, where the fabric is indicated by the reference-letter $c'$. The several presser-feet are attached to a fixed rod 43 in such manner that they may be independently adjusted on said rod, or the latter may be rocked in its bearings to adjust simultaneously the entire series of feet. After such adjustment the rod is clamped in place by means of set-screws 43'. Gear 39 is formed with a lateral arm 39', to which is hung a pawl 45, whose point may coact with a ratchet-wheel 44, having teeth or notches equal in number to the ribs 41, said ratchet being fixed to said cylinder. When the cylinder begins to descend, gear 39 is caused to partially rotate by rack 40, and at the same time the pawl 45, carried by said gear, engages a tooth of ratchet-wheel 44 and rolls the cylinder 31 forward as it descends, thus bringing the next rib 41 into position to pass beneath the presser-feet and moving the fabric forward to receive a new row of knots. The arrangement of ratchet-teeth relative to pawl 45 is such that the roll drops a considerable distance before said pawl engages the teeth, thus permitting the upper rib 41 and the fabric to pass below the curved presser-feet before said roll begins to revolve.

When it is desired to produce knots in quincunx form, I provide switches, as shown in details in Figs. 28 to 31, that operate to slide the cylinder lengthwise on its bar 32 at each feeding of the fabric. These switches are secured to the frames $a$ $b$ adjacent to bars 35 and consist of plates 45' with angular edges or walls 46, having pivoted within the recess so formed a wedge-shaped piece 47, that is adapted to be swung from side to side in said recess within the limits defined by the angle-walls 46. The upper end of said wedge-shaped piece 47 is shaped as an inverted letter V, and immediately over said piece is a flat spring 48, whose free end is bent downward, terminating in a sharp edge that engages the V-shaped end of the wedge-piece and operates to crowd said piece to the right or left hand, as the case may be, and to throw the point of the wedge into contact with one of the walls 46. When the point of the wedge is carried past the center of its pivot, the V-shaped projection at the upper end forces spring 48 upward and allows it to pass to the opposite side of said V, as will be readily understood by reference to the detail views of the complete switch.

Journaled on a stud projecting from one side of each bar 35 is a roller 49, which, as the bar is raised and lowered, travels in the recess 45, being governed in its course by the described wedge-shaped piece. In the detail views 29 to 31 bar 35 is not shown; but its roller 49 is illustrated in several positions, each of which I will explain. Beginning with Fig. 28, we will assume that the roller is passing upward. Just before reaching the limit of its travel it engages and pushes before it a laterally-projecting horn 47' on the wedge-shaped piece 47 and rocks said wedge on its pivot until the point of spring 48 passes the highest point of the V-shaped end, when said spring at once forces the wedge over into the position shown in Fig. 29. When the roller reverses its movement and travels downward, it crowds the point of the wedge toward the center of recess 45, but not far enough to permit the spring to pass the V-point, (see Fig. 30,) so that after the roller drops below said wedge the latter is forced by the spring into the position shown in Fig. 31. At the next upward movement of the roller it and the connected bar 35 are shunted to the right hand or opposite side of the recess, as also explained by Fig. 31. When said roller nearly reaches its highest position, it engages a horn $47^2$ on the wedge and forces it over into the position illustrated in Fig. 28. The continued upward and downward movement of the bar and roller acting in connection with the described switch serves to shunt the ribbed cylinder 31 alternately to the right and left hand, thus changing the position of the fabric between the successive knotting operations. The ribs 41 on cylinder 31 are notched, as at 50, at the points where the needles are to pass through the crimped fabric, and the several presser-feet are also cut away (forming an oval slot, as seen in Fig. 1) to allow the passage of said needles. These needles 51 are carried by reciprocating needle-arms 52, secured to a rock-shaft $d$, hung in bearings at the top of the machine, said rock-shaft being actuated at proper times by mechanism best explained in Fig. 3, in which 53 denotes a heart-cam hung on a stud projecting from frame $a$, and 54 a gear connected to said cam and driven by a similar gear 55 on the end of shaft 15. (See Figs. 1 and 24.) 56 denotes an arm secured to rock-shaft $d$ at one end, its opposite or free end being connected by a rod 57 with one end of an angle-lever 58, that is fulcrumed near its center on a stud 59 in frame a. The lower end of this angle-lever bears a roller 60, that rests on and follows the periphery of cam 53. At each revolution of the cam the angle-lever, rod 57, and arm 56 operate together to rock shaft d and the entire series of needle-arms, and thus cause the needles to move forward in arc-shaped paths and to pass with the thread through the fabric that has previously been crimped upon the upper rib 41. The normal or starting position of the needle is perhaps best seen in Fig. 11, while its extreme forward position is shown in Fig. 12. The rod 57 is connected by arm 56 in such manner that it may readily be adjusted toward or away from the rock-shaft d to vary the leverage and resulting "throw" of the needle-arms 52. Provision for such adjustment is desirable, if not absolutely necessary, for the reason that in knotting fabrics of different thickness different lengths of yarn are required. If no means of regulating the throw of the needle were provided, it would be necessary to plan the machine for use with the thickest fabric, and when used with thin fabric a piece of yarn would be wasted on the formation of each knot. By providing suitable adjustment, as here shown, the movement of the needle may be regulated to deliver exactly the required length of yarn and so avoid such loss.

Brackets or bars 61 are fastened along the top of the machine to support bobbins, from which the knotting-yarn may be drawn by the needles, as required, a wire tension-eye 62 being preferably provided immediately over each bobbin to insure the perfect rendering of said yarn, which then passes through suitable eyes 63 64 on the needle-arm and through the eye of the needle, which is near its point, as in sewing-machine needles.

The knotting mechanism includes several elements, which while they work in harmony are distinct in character and action and are each operated independently of the others. These elementary mechanisms consist of, first, the needle whose office is to pass the yarn through the fabric, as already explained; second, a hook for holding a loop of the yarn as the needle recedes; third, nippers for holding the yarn on the opposite or needle side; fourth, a spiral hook for grasping the yarn and interlacing it in such manner that a perfect knot is produced; fifth, a depending wire (or looper) arranged to rotate around said spiral hook to assist in forming the knot; sixth, a stripping-hook attached to the presser-foot, and, seventh, a knife for severing the yarn on completing the knot.

Turning now to Figs. 4, 7, 8, and 11, the reference-figures 65 denote journal-bearings secured to the girder-frame c, having hung therein vertical shafts 66 and 67, which respectively bear at their lower ends the spiral hook 68 and looper 69. The peculiar arrangement and mode for supporting these devices permit them to be raised, lowered, or rotated. Shaft 67, which bears the looper-wire 69, is tubular and is journaled only in the lower bearing 65. The lower end of said tube is formed with a lateral arm 67' to receive the looper 69, and the upper end bears a wide gear 70, that meshes with and may be rotated by a rack 71, that is longitudinally movable in slotted plates 72, secured between the journal-bearings 65. When rack 71 is moved lengthwise, gear 70 and tube 67 are partly rotated, thus causing the looper 69 to swing around the spiral hook 68. To cause said looper to rise or fall at desired times, I provide a fixed collar 73 beneath the lower bearing 65 and cut in the periphery of said collar a cam-groove 74. When the tube 67 is rotated, the stud 76, following the cam-groove, causes said tube to assume the varying course of the groove and to correspondingly raise or lower the looper 69, carried by said tube. The shaft 66, which carries and controls the spiral hook 68, is journaled at its lower portion in the described tube 67 (see Fig. 9) and at its upper end rotates in a collar 77, loosely fitted in the upper journal-bearing 65. Above collar 77 is a narrow collar 78, secured to shaft 66 by set-screw or spline, and below it is the gear 79. This gear 79 meshes with a rack 80, arranged to slide in the same manner as the lower rack 71, and it will be understood that when rack 80 is moved the shaft 66 and the spiral hook will be correspondingly rotated. Provision is also made for raising the shaft 66 and spiral hook as follows: A shaft 81, parallel with the racks 71 and 80, is located in the rear of the lower end of collar 77, and on this shaft are fixed collars 82, that are cut away in part, as shown in Fig. 9, to receive a radial spur 83, projecting from collar 77. A spring 84' is provided between said spur and a bracket 85' on the upper journal-bearing 65 and serves by its expansive force to hold the collar 77, shaft 66, and the spiral hook in their lowest positions. When, however, the horizontal shaft 81 is rocked slightly, collars 82 force spur 83 and its connected parts upward, and it will thus be seen that the spiral hook may be rotated and at the same time moved vertically in its bearings.

The hook which I have referred to as "holding the loop of yarn as the needle recedes" is indicated by reference-figures 84 and is shown clearly in several views. The hooks of the entire series are secured to a rod 85, to which is also secured at one end an arm 86, whose free end is connected by rod 87 with one end of a lever 88, fulcrumed on a stud 89, projecting from the frame b, the other end of said lever bearing a roller that enters and is guided by a groove-cam e on the vertical shaft 29. (See Figs. 1, 2, and 7.) When cam e is rotated, lever 88 and rod 87 are caused to move upward or downward, according to the course of the cam-groove, and rod 85 is rocked to raise or depress the hook 84. Rod 85 is suspended by two or more arms 90 from a rock-shaft 91, hung in brackets 92, projecting from the machine-frames, thus permitting the rod 85 and its attached hooks 84 to be swung outward or inward to control the position of said hooks. Shaft 91 has secured to it near each end arms 93, that are connected by rods 94 with similar arms 95, depending from the rock-shaft $d$, which I have above described as carrying and controlling the series of needle-arms, and it will thus be seen that the swinging movement of the hooks 84 is controlled by said rock-shaft $d$ and that in consequence said hooks and needle-arms must work in unison—that is to say, when said shaft is rocked to cause the needles to pass the yarn through the fabric the hooks will at the same time advance until they are immediately over the needles, as shown in dotted lines in Fig. 12, and while in this position rod 85 is rocked by cam $e$ to drop the hook when the points of the latter pass between the needle and the yarn, as in full lines in said Fig. 12. When the shaft $d$ is again rocked to withdraw the needles, hooks 84 are moved in the opposite direction, drawing with them the loop of the thread, as seen in Fig. 13. Immediately beneath the needle-arms is a rock-shaft 96, supported in bearings at each end, as more fully described hereinafter, and having secured thereon a series of collars 97, each bearing an arm 97', having hinged to its free end a pair of nippers 98 98', that are adapted to be closed on the yarn at proper times to hold it in desired position during the knot-tying operation. One of the nipper-sections, 98, is provided with a laterally-extending spur 99 at the lower portion of its outer end, which spur is of a length equal to or slightly greater than the distance which the jaws of the nippers are expected to open. When the needle carries the yarn forward through the fabric, it passes between the open jaws of the nippers, and as it returns to its starting-point the yarn is left between the nippers, as illustrated by Fig. 13, and is then prevented from dropping below the ends of the jaws by the spur 99, which extends across the bottom of the opening. When the needle is passed rearward, the nippers are closed upon the yarn and hold it with sufficient tension during the operation of tying the knot. Secured to shaft 96 are collars 100, formed with bracket-arms terminating in journal-bearings 101, in which is supported a smaller rod 102. This smaller rod is arranged to move longitudinally and is used to open or close the jaws of the described nippers. On rod 102, near each of the nippers, is secured a collar 103, against which abuts one end of a spiral spring 104, coiled around said rod. The opposite end of said spring abuts an arm $98^2$ of jaw 98, that extends toward shaft 96. Arm $98^2$ may be drilled to receive the rod 102 or may have simply a semicircular seat for said rod, as shown in Figs. 4 and 5. Springs 104 act with a constant tendency to hold the jaws closed, and the "bite" of said jaws will of course be governed by the expansive force of said springs. When it is desired to open the jaws of the nippers, rod 102 is moved longitudinally by the following-described means: Located loosely on shaft 96 near one end is a groove-cam 105, into which projects a stud or roll 106 on the end of rod 102, this cam being controlled by gear 107, secured to said cam. When gear 107 and the connected cam are revolved, roll 106, following the serpentine course of the cam-groove, causes shaft 102 to move lengthwise. The bearings that support shaft 96 are located at the free ends of angle-levers 108, journaled on a rock-shaft 109, which is supported in bearings secured to the frames of the machine, as best seen in Fig. 7. A gear 110 and connected sprocket-wheel 111 are mounted loosely on said shaft 109, the gear being in mesh with the gear 107, above described, and the sprocket-wheel being connected by a chain 112 with a similar sprocket-wheel 113 on shaft 15. (See Figs. 1, 4, and 7.) When shaft 15 is rotated, the described system of gears, sprockets, and chain cause gear 107 and the cam 105 to revolve, whereupon the rod 102 is moved lengthwise in its bearings to open or close the series of nippers. In order to partly rock the shaft 96 to raise or depress the jaws of the nippers, I have secured to said shaft a radial arm 114, whose end is connected by a rod 115 with the free end of a lever 116, hinged to the machine-frame at 117. (See Fig. 7.) On the side of lever 116 is a roll that lies in the groove of a cam $f$, located on the vertical shaft 29. At each revolution of this vertical shaft the deflection of the groove in said cam causes lever 116 to drop and then to rise again, and thus rock the shaft 96 and its series of nippers.

I have now shown that the jaws of the nippers may be opened and closed and that they may be raised and lowered in the arc of a circle. Their outer ends are also capable of being moved bodily toward and away from the spiral hook 68. The mechanism for thus moving the nippers is seen in Figs. 1, 2, 4, 6, and 7, and consists of an arm 118, said arm being connected by a rod 119 with the free end of a lever 120, hinged to the machine-frame $b$. This lever bears on its side a roll that lies in the groove of a cam $g$ on the vertical shaft 29. At each revolution of said cam the lever 120 is raised and acts through rods 119 and arm 118 to rock the lever 108 on shaft 109, and thus move forward or backward, as the case may be, the shaft 96 and its series of nippers.

In addition to the several elements of the knotting mechanism already described there is provided a stripping-hook 121, which consists, as here shown, of a simple wire projecting upward from the presser-foot 42, having its end bent toward the spiral hook. When the looper 69 is swung (with the thread) around the spiral hook, as will be described later, the hook 121, lying in the path of the thread, serves to hold said thread and strip it from the looper 69 as the latter returns to its normal position. I have shown the stripping-hook 121 as attached to the presser-foot; but it could be as readily secured to or connected with some other element of the machine.

Figure 14:
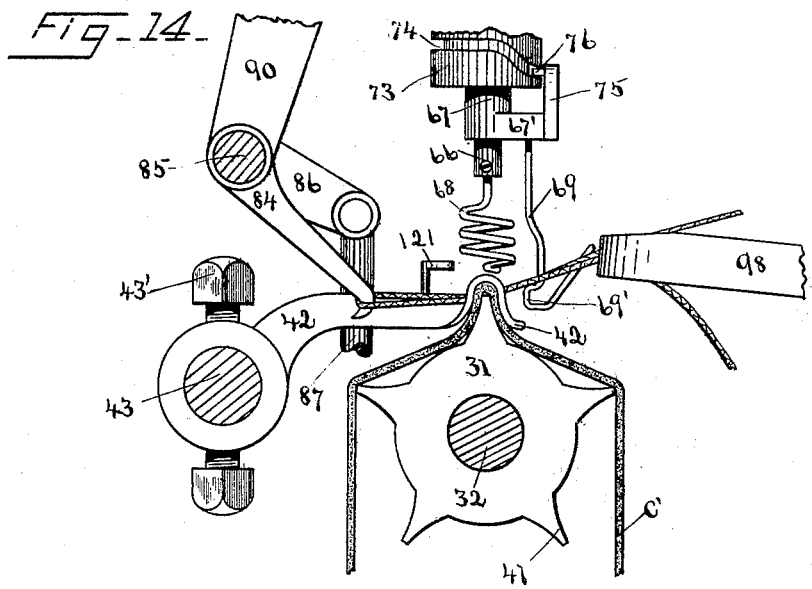
Figure 15:
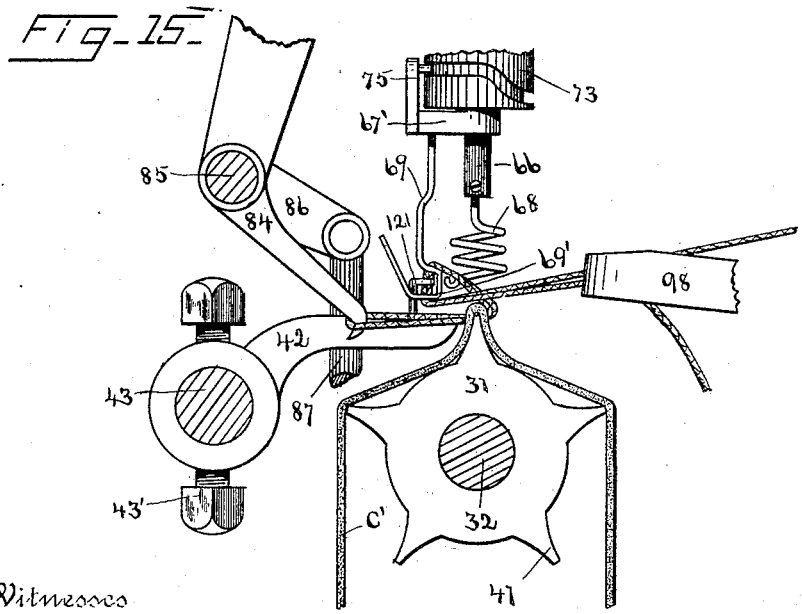
Figure 16:
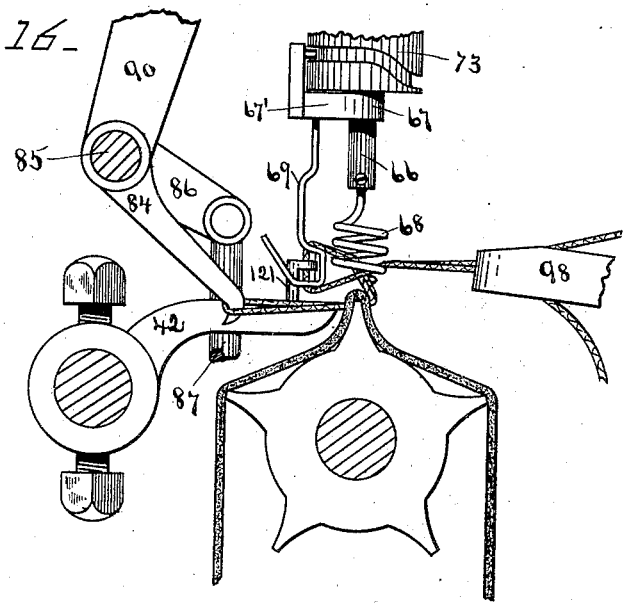
Figure 17:
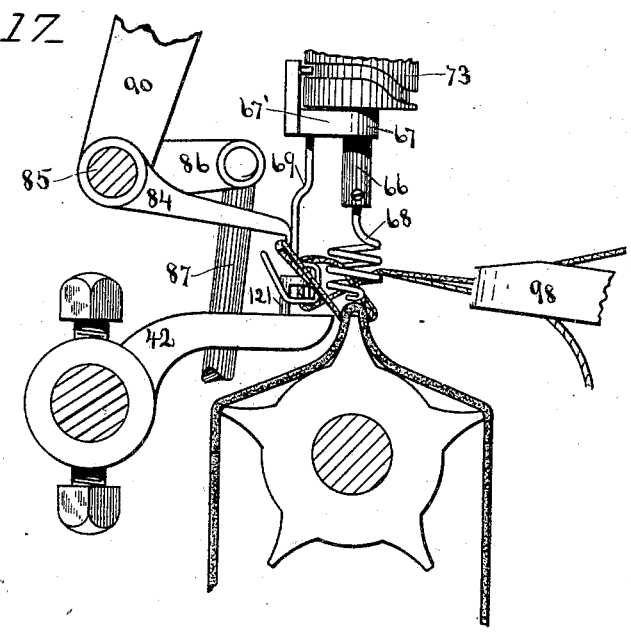
Figure 18:
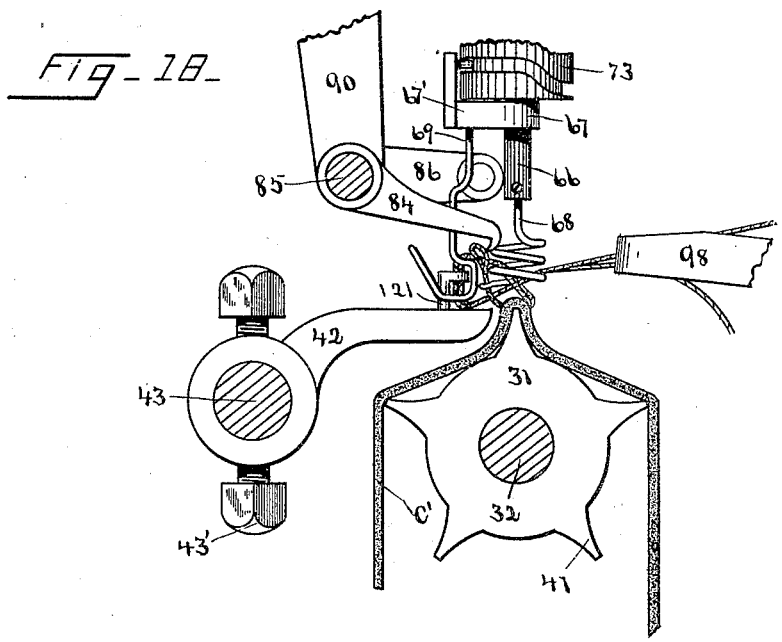
Figure 19:
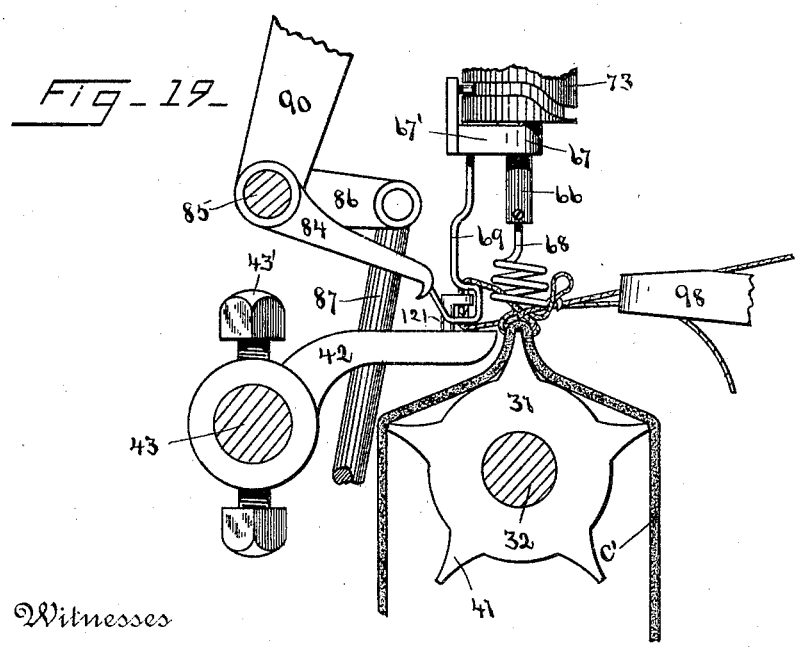

I have now described the several parts of my improved machine and the mechanism by means of which the various operative elements are controlled and caused to act at proper times and will proceed to explain the successive movements of the knot-tying mechanism. It will be assumed that the compound fabric has been fed forward in the manner set forth and that it is firmly clamped by the series of presser-feet, as shown in Fig. 14. (The presser-feet are purposely left out of the other figures to avoid complication.) The several steps taken and the positions assumed by the knot-tying devices are shown in correct succession in Figs. 11 to 23. The initial movement is that of the needle-arm 52, which advances and passes the needle-point and yarn through the compound fabric, as in Fig. 12, the hook 84 being at the same time advanced to the position shown in dotted lines in said figure. When the hook has reached the limit of its forward movement, the rod 87 is drawn downward, carrying with it the hook, whose point passes between the yarn and the needle, as shown in full lines in Fig. 12. The needle is then withdrawn, and the hook at the same time draws the loop of yarn in the opposite direction. As the needle recedes it leaves the two strands of yarn between the open jaws of the nippers, which immediately close on the yarn and hold it, as in Fig. 13. The shaft 96, which supports the nippers, is then rocked slightly to elevate the jaws, (see Fig. 14,) and the looper-wire 69 begins to travel around the spiral hook. Its course is first downward (following the groove 47) until its loop 69' can pass beneath the two strands of yarn, when it (the looper 69) again rises to pass over the presser-foot and continues until the yarn is looped and carried slightly past the stripping-hook 121, as in Fig. 15. The looper 69 remains for a time in this position. The free end of said looper is of considerable length and projects outward at an angle that allows it to ride over the yarn as the looper begins to revolve around the spiral hook. As the looper continues to revolve its end forces the yarn downward, drawing said yarn through the jaws 98 98', which hold it only by friction, and the yarn finally assumes the loop form shown in Fig. 15. At this stage of operations the spiral hook 68 begins to revolve from the right to the left, the end or hook proper entering and passing through the loop which I have just described. In Fig. 15 the hook is seen as just entering the loop, while in Fig. 16 it has made nearly a revolution and has passed one of its coils through. The hook continues to revolve until one and one-half of its coils have been passed through the loop, when the spiral hook stops. (See Fig. 17.) The hook 84 is then elevated to raise its loop of yarn, when the spiral hook begins its return movement. Just as said spiral hook grasps the yarn and begins to carry it through the larger loop the hook 84 is advanced to drop the yarn, as seen in Fig. 18. The spiral hook continues to revolve from left to right until it has carried the doubled yarn through the large loop twice and until it (the spiral hook) reaches its normal or starting position. In Fig. 19 the said hook is shown with the yarn in its grasp approaching the loop for the last time. After the hook passes out of the loop (see Fig. 20) the looper 69 begins to travel back to its normal position, the yarn being stripped from it by the stripping-hook 121. (See Fig. 21.) Meanwhile the spiral hook continues to move with the yarn in its grasp until the hook is immediately over the presser-foot, when said hook is forced downward (see Fig. 22) until the yarn is firmly clamped between said hook and presser-foot. The several parts of yarn are now suitably interlaced to tie a perfect knot, but are not drawn taut. This final step in the tying of the knot is accomplished by moving the nippers outward, as in Fig. 22, until the knot is drawn hard, the rod 102 being meanwhile moved endwise by cam 105 to cause the nippers to grasp the yarn more firmly. A knife 122 then swings downward across the doubled yarn to cut it off, as illustrated in Fig. 23. So soon as the yarn has been cut the jaws 98 98' are moved forward (toward the spiral hook) until the cut end of said yarn drops through the jaws and hangs in the rear of the spur 99, the short severed end dropping meanwhile to the floor. When the needle again starts forward to begin a new knot, both strands of yarn are within the nippers in position to be grasped when the needle returns to its normal or starting position.

Figure 22:
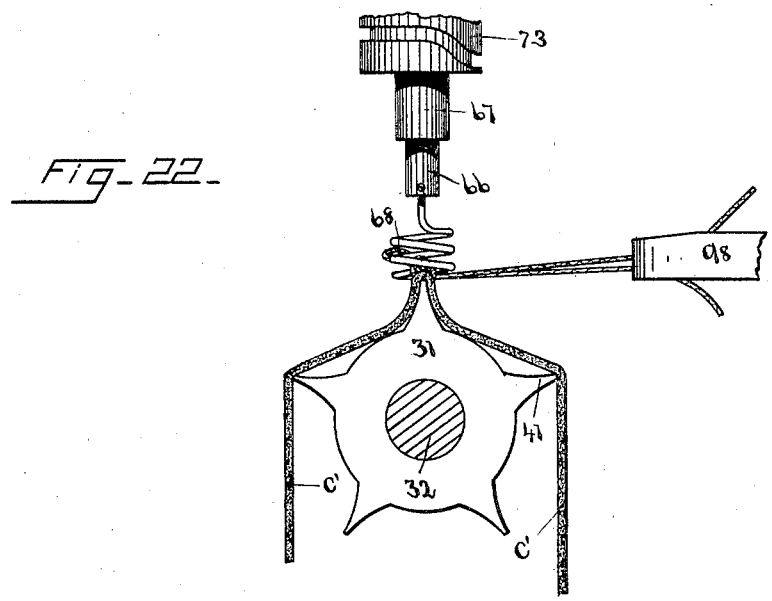
Figure 23:
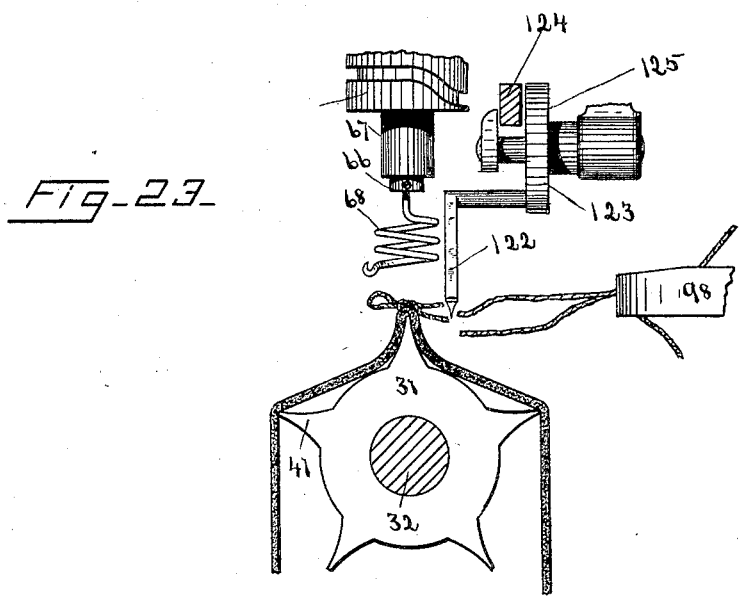
Figure 28:
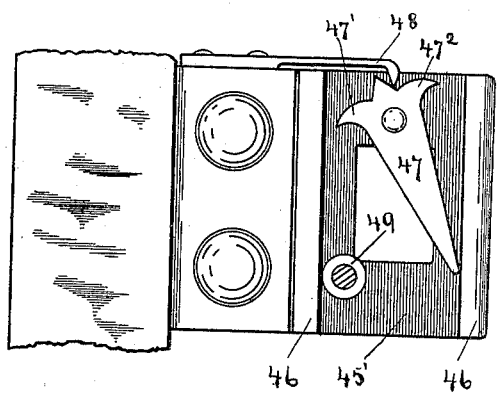
Figure 29:
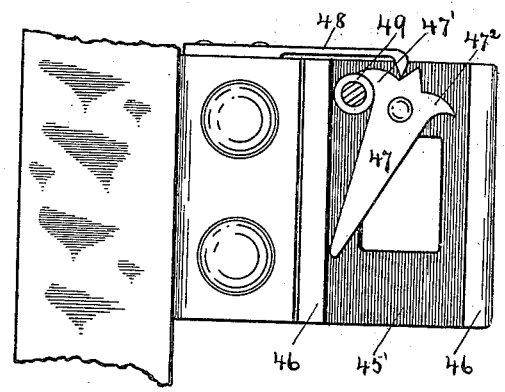
Figure 30:
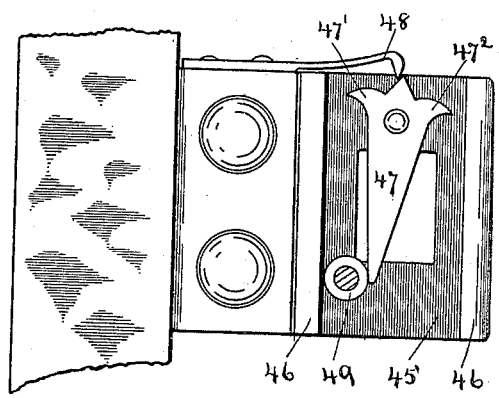
Figure 31:
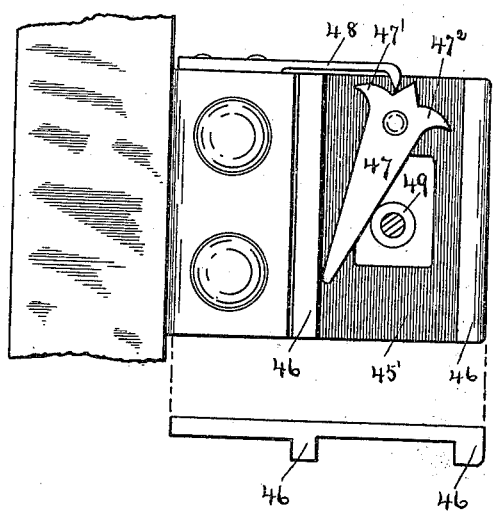

The knife for severing the yarn after the knot is tied is shown most clearly in Figs. 1, 4, and 8, also in Fig. 23, and consists of a cutting-blade 122, projecting from a disk 123, and adapted to be moved in an arc of a circle across the yarn when the latter is drawn taut by the nippers, as in Fig. 22. In front of the entire series of disks 123 is a bar 124, that may have a limited longitudinal movement in its bearings and which is provided with studs 125, (see Fig. 23,) that extend into radial slots in said disk. These radial slots are indicated by dotted lines in Fig. 8. When the bar 124 is moved lengthwise, the studs 125 rock disks 123, and thus swing the knives into cutting contact with the yarn. Bar 124 is connected at one end with a rod 126, which in turn is connected with the free end of a lever 127, that is hinged at its other end to the machine-frame b. (See Figs. 1, 2, and 7.) A stud or roll 127' follows a cam h and serves to slide the rod 126 forward and backward in its bearings at each revolution of said cam, and thus operate the knife 122. The knife 122 is here shown as arranged to cut on its outer edge; but it may as readily be sharpened on its inner edge and caused to swing under the yarn.

Racks 71 and 80, which I have described as controlling the rotation of the looper 69 and spiral hook 68, are moved longitudinally by cams and levers in manner and forms substantially like those that operate the rod 124. Rack 80 is connected by a rod 128 with a lever 129, controlled by a cam-groove in the upper side of the disk $k$, and rack 71 is similarly connected by a rod 130 with a lever 131, controlled by a cam-groove in the lower side of said disk.

The so-called "spiral" hook, which performs an important part of the knotting operation, is shown here as made of wire coiled in spiral form and terminating with a hook; but it could be drop-forged or made in any other practical manner. The looper 69 could also be made of other material than wire—as, for example, of sheet metal struck up into desired form.

While my newly-invented knotting-machine is particularly valuable for use in the production of bed-comfortables, I wish it to be understood that it may also be used with great advantage for ornamenting draperies, portières, &c., consisting of either single or compound fabrics.

While I do not limit myself to the precise knotting devices herein shown and described in all the claims including "knotting" devices, but when said term is used by me without other qualification intend to be understood as including thereby any or all devices suitable for use in my machine and capable of forming complete knots in the thread or yarn in the common acceptation of the term "knots," yet I wish it distinctly understood that said term is not intended to include any of the continuous stitches formed by sewing-machines, (either interlooped, lock, or chain,) which machines do not form knots in the sense in which the term is used in this case. Attention is also called to the fact that it is essential to the general structure of this machine that the feeding means operate to feed throughout a relatively wide space to the end that each knot will be separated from its neighbors by clear spaces, so that the comfortable will present the appearance of a hand-made one, and in order that it will further similate a hand-made comfortable the yarn is severed between the knots and contiguous to each of the same. Thus the face fabrics and interposed filling composing a comfortable will be united by a multiplicity of sections of knotted yarn or thread each isolated from its neighbors, as in the hand-made comfortables. It is very advantageous to crimp the fabric over its support and to carry the thread or yarn through the crimped portion of the fabric by means of a needle or other suitable means operating wholly at one side of the main body of the support and to locate the knot-tying devices at the same side of the support as said thread or yarn carrying means. It is, furthermore, advantageous to arrange the knots in a succession of lines in the fabric and to reduce the time required to make the comfortable by forming a series or line of the same at once, and this is accomplished, according to my invention, by embodying in the structure a series of knot-tying devices, means for actuating the same simultaneously, means by which the fabric is held immovable during the formation of the series or line of knots, and a feeding means actuated when said series or line of knots has been formed to position parts automatically for the formation of another series or line of knots.

I do not claim knot-tying devices *per se* broadly, as they are not broadly new with me; but such devices have not been combined in a structure capable of performing the purpose of this machine.

Having described my invention, I claim—

1. In combination with a fabric-support, means for simultaneously tying a line of knots in said fabric, comprehending a series of knot-tying devices, means for severing the thread upon the completion of each knot, and devices for actuating said knot-tying devices simultaneously.

2. In a machine for forming comfortables, the combination with a fabric-support, of means for tying a succession of lines of isolated knots in said fabric, comprehending a series of knot-tying devices, means for actuating the same simultaneously, means for severing the thread upon the completion of each knot, and feeding means actuated after said line of knots has been formed to position the fabric for the formation of another line of knots in the fabric.

3. In a machine for the purpose specified, the combination with means for supporting the fabric, and means for crimping the fabric over its support, of devices for passing thread through the crimped fabric, mechanism for tying a succession of lines of isolated knots in said fabric, and means for severing the thread between the said knots.

4. In a machine for the purpose specified, the combination with a fabric-support, and a needle for carrying the thread through the fabric, of means for tying knots in said thread, and feeding mechanism constructed and operated to isolate the knots from each other by feeding appreciable distances between knotting operations, and means for severing the thread between the said knots.

5. A machine for tying together the face fabrics and interposed fillings of comfortables, comprehending a fabric-support, means for crimping the fabric over the same, devices for passing thread through the crimped fabric, means operating to tie in the thread-knots which are formed outside the fabric and lie upon the surface thereof, means for feeding an appreciable distance between the knotting operations to thereby isolate each knot from its neighbors, and means for severing the thread contiguous to each knot.

6. In a machine for the purpose specified, the combination with the ribbed fabric support and feeder, and means for crimping the fabric over the rib thereof, of the needle, operating wholly at one side of the main body of said support, for carrying thread through the fabric, devices, coöperating with the needle and operating on the same side of the body as the same, for forming in the thread knots which lie upon and are entirely outside the fabric, and means for holding said support immovable during the entire operation of tying the knot, substantially as shown and described.

7. In a knotting-machine, the combination with the fabric-support, the needle, a hook for holding a loop of the yarn as the needle recedes, nippers for holding the yarn, a rotatable hook for interlacing the yarn, and a rotatable looper.

8. In a knotting-machine, the combination of a fabric-support, a needle, a hook for holding a loop of the yarn as the needle recedes, nippers for holding the yarn, a rotatable hook for interlacing the yarn, and a rotatable looper; all of said parts being relatively located and operated so that the knot will be formed outside of and lie upon the surface of the fabric.

9. In a knotting-machine, the combination of a fabric-support, a needle, a hook for holding a loop of the yarn as the needle recedes, nippers for holding the yarn, a rotatable hook for interlacing the yarn, a rotatable looper, and a cutter, substantially as described.

10. In a knotting-machine, the combination of the fabric-support, the needle, a hook for holding a loop of the yarn as the needle recedes, nippers for holding the yarn on the needle side, a rotatable hook for interlacing the yarn, a rotatable looper, a stripper, and a cutter, substantially as described.

11. The combination with the fabric-support, and means for raising and lowering the same, of a pivoted wedge, said wedge being forced laterally during the raising and lowering of the fabric-support and serving automatically to force said fabric-support alternately in opposite directions, substantially as described.

12. The combination with the fabric-support, vertically-movable bars connected therewith, hinged arms with which the lower ends of said bars have a universal connection, and cams engaging said arms, of a switch, operated during the movement of said bars automatically to force said fabric-support alternately to the right and left, substantially as described.

13. The combination with the fabric-support, vertically-movable bars connected with said fabric-support, rollers on said bars, and means for raising and lowering said bars and thereby raising and lowering said fabric-support, of a switch engaged by said roller and serving during the movement of said bars automatically to force said fabric-support alternately to the right and left, substantially as described.

14. The combination with the fabric-support, movable up and down and to the right and left, of a wedge, pivoted at one end and having projections at its pivoted end, a spring having one end designed to engage said projections, and means raised and lowered by said fabric-support which will cause said wedge to force said fabric-support alternately to the right and left, in the manner and for the purpose specified.

15. The combination with a needle, and knotting devices coöperating therewith, of a ribbed fabric-support, means for crimping the fabric over a rib thereof, means for raising and lowering said support, and means for turning it when lowered to thereby feed the fabric.

16. A fabric supporting and feeding means, comprehending a ribbed cylinder, devices for raising and lowering the same automatically and means for turning it when lowered, substantially as described.

17. The combination with the vertically-movable fabric-support, bars 35, supporting the journal-bearings at the ends of said fabric-support, hinged arms with which the lower ends of said bars are connected, and cams operating said arms, substantially as and for the purpose described.

18. The combination with the vertically-movable fabric-support, having a plurality of ribs extending lengthwise thereof, of a series of presser-feet for crimping the fabric over said ribs, and series of needles and knotting devices, and mechanism for reciprocating said ribbed fabric-support, substantially as shown and described.

19. The combination with the ribbed and rotative fabric-support, and the ratchet secured thereto, said ratchet having the same number of teeth as there are ribs on the fabric-support, of a pawl, designed in its movement to engage said ratchet and thereby rotate the cylinder, substantially as described and for the purposes specified.

20. A fabric-support, having means for raising and lowering it, combined with devices controlled by said movements of the fabric-support for shifting the same to the right and left.

21. A fabric support and feeder, comprehending a ribbed rotatable cylinder, means for raising and lowering the same, and devices controlled by said means for rotating said cylinder and for shifting it to the right and left.

22. In combination with a curved presser-foot, a fabric-feeding roll having a plurality of ribs that may be successively brought into engagement with said presser-foot, and mechanism substantially as specified for raising, lowering reciprocating longitudinally, and rotating said feed-roll automatically.

23. The combination with the ribbed fabric-support, an arm, movable up and down, upon which said fabric-support is loosely mounted, a ratchet fixed to said fabric-support, a gear on the end of said arm, and a rack-bar, engaging and operating said gear as the fabric-support descends, of a pawl, movable with said gear and adapted to engage said ratchet in the downward movement of the fabric-support, substantially as described.

24. The combination with a needle, of a rock-shaft with which the needle is connected, a rod, a hook carried by said rod, connections intermediate said rod and rock-shaft, and means for rocking said rod, to raise and lower said hook.

25. The combination with the needle, and the rock-shaft $d$, with which said needle is connected, said rock-shaft having an arm 95, a hook 84, a rod 85, a rock-shaft 91, from which said rod is suspended, arm 93, secured to said rock-shaft 91, rods 94, connecting said arms 95 and 93 together, knotting mechanism and mechanism for operating the same, substantially as described.

26. In a knotting-machine, in combination with the needle, a rotatable hook for interlacing the yarn, a looper rotatable around said hook, means for raising and lowering said looper and hook, a hook 84, and nippers for grasping the thread, substantially as described.

27. In a knotting-machine, the combination with the needle, a rotatable hook for interlacing the yarn, a looper rotatable around said hook, said looper having a loop at its lower end, a means for holding said looper normally in its lowermost position and means for raising and lowering said looper and hook, and hook 84 and nippers for grasping the thread, substantially as described.

28. The combination with a fabric-support, and a needle for passing thread through the fabric, of thread-knotting mechanism comprehending thread-looping, interlacing and tightening devices and including a pair of thread-nipper jaws located in the path of the needle, one of said nipper-jaws having at its free end a spur extending from its lower side laterally, to and beyond the companion jaw.

29. The combination with a fabric-support, and a needle for passing thread through the fabric, of a thread-knotting mechanism comprehending a spiral hook, a looper movable in a path surrounding said hook, means for actuating said hook and looper, and devices coöperating therewith in forming the knots.

30. The combination with a fabric-support, and a plurality of needles actuated to pass thread through the fabric, of a plurality of knotting mechanisms each including a hook for holding a loop of the thread on one side of the path of the needle through the fabric, nippers for holding the thread on the other side of said path, each of said nippers having a movable spring-pressed jaw, looping and interlacing devices, and devices for operating the several parts at proper relative times, said devices including a movable rod to engage and open said movable jaws.

31. The combination with a fabric-support, and a needle for passing thread through the fabric, of a knot-tying mechanism comprehending thread looping and interlacing devices, and thread-engaging means at opposite sides of the path of the needle through the fabric, coöperating with the looping and interlacing devices in the formation of the knots, said thread-engaging means comprising thread-nippers, means for automatically opening and closing the same at proper relative times, and means for moving the same bodily at proper times.

32. The combination with a fabric-support, and a needle for passing thread through the fabric, of knot-tying devices including thread-nippers, means for automatically opening and closing said nippers, and for rocking them to raise and depress their free ends, and for moving them bodily, for the purposes set forth.

33. The combination with a fabric-support, and a needle for passing thread through the fabric, of a knot-tying mechanism comprehending a suitable thread-engaging means, a looper and an interlacer, and means for holding the thread during the tying operation and drawing the knot tight at the conclusion of its formation.

34. The combination with a fabric-support, and a needle for passing thread through the fabric, of a knotting mechanism comprehending a hook at one side of the path of the needle through the fabric, means for actuating said hook bodily and pivotally at predetermined times, nippers located at the other side of the path of the needle through the fabric, means for opening and closing said nippers, for rocking them to raise and depress their free ends and for moving them bodily, a looper and an interlacer between said hook and nippers, means for turning said looper and interlacer and for raising and lowering the same at proper relative times, and a stripper.

35. The combination with a fabric-support, and a needle for passing thread through the fabric, of a pair of thread-nipper jaws between which the needle travels, one of said jaws having at its free end a spur which extends toward the other jaw, means for moving said jaws to and from each other to grasp and release the thread, devices coöperating therewith in the formation of knots in the thread, and means for moving said jaws bodily to tighten said knots.

36. The combination with a fabric-support, and a needle for passing thread through the fabric, of a bodily and pivotally movable hook, a bodily and pivotally movable thread engager, devices intermediate the same to cooperate therewith in the formation of a knot, and mechanism for actuating said parts at proper relative times.

37. The combination with a fabric-support and a needle for passing thread through the fabric, of a pair of thread-nipper jaws between which the needle travels, one of said jaws having at its free end a spur which extends toward the other jaw, means for moving said jaws to and from each other to grasp and release the thread, a hook to engage the thread, means for moving the needle and said hook simultaneously to and from each other, and for moving the hook pivotally, a spiral hook mounted to be turned alternately to the right and left and to be raised and lowered, a looper mounted to rotate around said hook and to be raised and lowered, and means for actuating said hook and looper.

38. The combination with the fabric-support and needle, of nippers, means for opening and closing the jaws thereof, the shaft supporting said nippers, an arm 114, secured to said shaft, a lever 116, a rod 115, connecting said arm and lever, and a cam engaging said lever and knot-tying mechanism, substantially as described and for the purpose specified.

39. In a knotting-machine, a fabric-support, knotting mechanism consisting of a spiral 68, looper 69, a needle for passing the yarn through the fabric, a hook 84, nippers 98 98', mechanism as herein described for actuating said elements and a stripping-hook 121; all of said elements and mechanisms being constructed and combined substantially as and for the objects specified.

40. In combination with the driving-shaft 10, a supplemental shaft 15 bearing a gear 55 and connected to the driving-shaft by mechanism as described, a cam 53 connected by gear 54 with gear 55, a rock-shaft $d$ bearing a plurality of radial needle-arms, and lever connections, as described between the said rock-shaft and cam 53.

41. In combination with a feed-roll having a ratchet-disk 44 a gear-segment bearing a pawl arranged to engage successively the teeth of the ratchet-disk when rotated, a fixed rack in mesh with the gear-segment and mechanism substantially as described for lowering and raising said feed-roll for the purpose set forth.

42. The combination with the driving-shaft, having a gear, and a ratchet-wheel loose on said shaft, said ratchet-wheel having a cam-disk, of a supplemental shaft, having a loose gear intermeshed with the gear on said driving-shaft, a pivoted arm, a spring-detent engaging said ratchet and also serving to hold said arm yieldingly into contact with said cam-disk, a pin, movable with said loose gear and engaging the teeth of said ratchet, and a clutch on said supplemental shaft operated by said arm, substantially as described and for the purpose specified.

43. The combination with a fabric-support, a needle for passing thread through the fabric, and knot-tying mechanism, of a series of disks each having a cutting-knife, a bar connected with each of said disks and actuated to rock the same so as thereby to operate said knives, and means for actuating said bar.

44. The combination with means for crimping the fabric, and a needle for passing thread through the crimped fabric, of devices for tying knots in said thread, means by which the fabric is fed throughout a considerable distance between each knotting operation, and means actuated automatically to sever the thread upon the completion of each knot.

45. The combination with a series of knotting mechanisms, each of which includes a thread-clamp having a movable jaw, and a longitudinally-movable rod connected with each of said movable jaws, of means for moving said rod longitudinally to open and close said jaws, substantially as described.

46. The combination with a series of knotting mechanisms, each of which includes a thread-clamp having a movable jaw, and springs acting on said jaws in one direction, of a rod connected with each of said movable jaws, said rod acting in opposition to said springs, a cam connected with said rod and actuated to move the same lengthwise, and means for actuating said cam.

47. The combination with a shaft, 96, and a series of knotting mechanisms each of which includes nipper-jaws movable with said shaft, of means for rocking said shaft to raise or lower the free ends of said jaws, said means consisting of a vertical shaft 29 having a cam, means for rotating the same, a pivoted lever engaged by said cam, and a radial arm on said shaft 96 connected to said lever.

48. The combination with a fabric-support, a needle for passing thread through the fabric, a shaft 96 and a series of knotting mechanisms having nipper-jaws movable with said shaft, of mechanism for rocking said shaft and for moving the same bodily at predetermined intervals, and devices for causing the nipper-jaws to grasp and release the thread.

49. The combination with a fabric-support, a needle for passing thread through the fabric, a shaft 96, and a series of knotting mechanisms having nipper-jaws movable with said shaft, of means for causing said jaws to clamp and release the thread, and means for moving the jaws bodily to tighten the knots, the latter means embodying an angle-lever having one of its arms supporting said shaft, a cam, a hinged lever actuated by said cam, and a rod connecting one end of said lever with the other arm of said angle-lever.

50. The combination with a fabric-support, a needle for passing thread through the fabric, a shaft 96, and a series of knotting mechanisms having nipper-jaws movable with said shaft, of means for causing said jaws to clamp and release the thread, and means for raising and lowering said jaws pivotally and for moving them bodily, embodying a shaft having cams, a hinged lever connected with one of said cams, a radial arm connected with said shaft 96, a lever connecting said arm with said hinged lever, an angle-lever in one arm of which said shaft 96 is journaled, a lever hinged to the machine-frame and actuated by another of said cams, and a rod connecting the other arm of said angle-lever with the latter hinged lever.

51. In a knotting-machine, the combination with a constantly-operating driving-shaft, and a fabric-feeder operated thereby, of a supplemental shaft, connections between said driving and supplemental shafts for imparting intermittent motion to the latter, and knotting devices connected with the supplemental shaft and partaking of the intermittent motion thereof.

52. In a knotting-machine, the combination with a needle, a spiral hook, means for rotating said hook, a looper, means for rotating the looper through a path surrounding said spiral hook, and a stripping-hook in the path of the thread being swung around said spiral hook by said looper.

53. The combination of a constantly-operated driving-shaft, a supplemental shaft, gearing between said driving-shaft and supplemental shaft, a clutch on said supplemental shaft for making said gearing operative and inoperative, a cam on the driving-shaft, a lever operated by said cam and operating said clutch, and knotting devices operated by said supplemental shaft.

WILLIAM H. PALMER, Jr.

Witnesses:
FRANK H. ALLEN,
ALONZO M. LUTHER.